US012199769B2

(12) United States Patent
Ljung

(10) Patent No.: US 12,199,769 B2
(45) Date of Patent: Jan. 14, 2025

(54) UE PROCESSING LOAD INDICATION

(71) Applicant: Sony Group Corporation, Tokyo (JP)

(72) Inventor: Rickard Ljung, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/036,600

(22) PCT Filed: Dec. 2, 2021

(86) PCT No.: PCT/EP2021/083947
§ 371 (c)(1),
(2) Date: May 11, 2023

(87) PCT Pub. No.: WO2022/122541
PCT Pub. Date: Jun. 16, 2022

(65) Prior Publication Data
US 2024/0014933 A1    Jan. 11, 2024

(30) Foreign Application Priority Data
Dec. 7, 2020  (SE) .................................... 2051428-7

(51) Int. Cl.
*H04L 1/08* (2006.01)
*H04L 1/1822* (2023.01)
(Continued)

(52) U.S. Cl.
CPC .............. *H04L 1/08* (2013.01); *H04L 1/1822* (2013.01); *H04W 8/24* (2013.01); *H04W 24/02* (2013.01)

(58) Field of Classification Search
CPC .......... H04L 1/08; H04L 1/1822; H04W 8/24; H04W 24/02
(Continued)

(56) References Cited

U.S. PATENT DOCUMENTS

| 8,959,171 B2* | 2/2015 | Chadalapaka .......... H04L 69/32 709/212 |
| 2006/0120336 A1* | 6/2006 | Fantaske ............... H04L 1/0018 370/349 |

(Continued)

FOREIGN PATENT DOCUMENTS

| WO | 2016088302 A1 | 6/2016 |
| WO | 2017184049 A1 | 10/2017 |

OTHER PUBLICATIONS

Kliazovich et al., Distributed Protocol Stacks: A Framework for Balancing Interoperability and Optimization, 2008, IEEE, pp. 241-245 . (Year: 2008).*

(Continued)

*Primary Examiner* — John J Tabone, Jr.
(74) *Attorney, Agent, or Firm* — Tucker Ellis LLP

(57) ABSTRACT

A method of operating a wireless communication device (101) connectable to a communications network (100), the method comprising: communicating, using at least one communication protocol, first data (271) between the wireless communication device and the communications network, and transmitting, to the communications network, second data indicative of an aggregated processing load used by the wireless communication device to operate a predetermined section of at least one multi-layer communication protocol stack of the at least one communication protocol when communicating the first data.

20 Claims, 6 Drawing Sheets

(51) Int. Cl.
*H04W 8/24* (2009.01)
*H04W 24/02* (2009.01)

(58) Field of Classification Search
USPC ........ 714/748, 749; 375/224, 225, 295, 316;
455/21, 293, 71, 75
See application file for complete search history.

(56) References Cited

U.S. PATENT DOCUMENTS

| | | | | |
|---|---|---|---|---|
| 2012/0182918 | A1* | 7/2012 | Jen | H04L 1/1825 370/312 |
| 2016/0344517 | A1* | 11/2016 | Bergström | H04W 72/51 |
| 2019/0104543 | A1 | 4/2019 | Park | |
| 2020/0329389 | A1 | 10/2020 | Hosseini | |
| 2020/0344006 | A1 | 10/2020 | Shellhammer | |
| 2022/0159540 | A1* | 5/2022 | Park | H04W 36/30 |
| 2022/0159562 | A1* | 5/2022 | Yoon | H04W 76/10 |
| 2022/0174135 | A1* | 6/2022 | Kim | H04L 1/1874 |
| 2024/0014933 | A1* | 1/2024 | Ljung | H04L 1/08 |

OTHER PUBLICATIONS

International Search Report from corresponding International Application No. PCT/EP2021/083947, mailed on May 12, 2022, 6 pages.
Harri Holma et al., "Radio Resource Management", LTE for Umts: OFDMA and SC-FDMA based radio access, dated Jan. 16, 2009, pp. 181-212.
Office Action and Search Report from corresponding Swedish Application No. 2051428-7, mailed on Sep. 8, 2021, 10 pages.

* cited by examiner

UE PROCESSING LOAD INDICATION

TECHNICAL FIELD

Various examples of the disclosure generally relate to a wireless communication device providing an indication of a processing load used by the wireless communication device to operate a predetermined section of a multi-layout communication protocol stack to a communications network. Specifically, an aggregated processing load can be signaled.

BACKGROUND

Wireless communication is widespread and proliferating. To accommodate for different radio scenarios and different types of wireless communication devices (UEs), it is possible to signal capabilities of a UE. For example, in the Third Generation Partnership Project (3GPP) wireless communication system operating according to the 3GPP New Radio (NR) communication protocol, the UE and the cellular network can utilize Feature Group Indications (FGI), to inform whether UE supports various features and functionalities. An FGI can be included in a Layer 3 Radio Resource Control (RRC) control message. For instance, capabilities of the UE such as UE category, supported bands, carrier aggregation band combination, etc. can be signaled. Details of the feature group indicator are described in 3GPP Technical Specification (TS) 36.331, Annex B, TAB. B.1-1, and 38.331.

It has been found that such signaling using a FGI can sometimes be comparably static and may limit the ability of the cellular network to react quickly to a change in the ability of the UE to support certain values of transmission parameters.

SUMMARY

Accordingly, there is a need for advanced techniques of providing indication from a UE to a communications network regarding a current status of the UE communicating payload data. In particular, there is a need for techniques which enable to signal information that allows to conclude which values of transmission parameters the UE can currently support when communicating the payload data.

This need is met by the features of the independent claims. The features of the dependent claims define embodiments.

Various techniques are based on the finding that—beyond static or semi-static capabilities of the UE to support certain values of transmission parameters when communicating payload data—the processing load required for operating a predetermined section of at least one multi-layer communication protocol stack when communicating payload data can also impose limitations to the UE being able to support certain values of one or more transmission parameters. Various techniques are based on the finding that, accordingly, can be desirable to provide, to the communications network, data indicative of a processing load used by the UE when communicating the payload data, or more specifically the aggregated processing load required to operate a predetermined, extended section of a multi-layer communication protocol stack including multiple processes of the multi-layer communication protocol stack.

Various techniques are based on the finding that prior-art implementations of transmitting a capability of the UE using an FGI are static or semi-static. Although such indications can be updated and changed if the UE, for some reason, would like to indicate a different capability as before, signaling of FGIs is done on the RRC protocol level, i.e., Layer 3 according to the Open Systems Interconnection (OSI) model. Accordingly, the delays for providing such signaling are comparably long, in particular, if compared to a length of transmission time intervals (TTIs) on Layer 1. Example TTIs would be time slots (e.g., 0.5 ms duration for 3GPP NR) or subframes. For instance, updates of the capability cannot be used for millisecond-based quick updates regarding the ability of the UE to support certain values of one or more transmission parameters, e.g., in view of changes to in the processing load used by the UE when communicating payload data.

Accordingly, according to various examples, a UE can transmit information regarding the processing load at low-latency to the communications network, thereby informing the communications network of a current ability to support values of one or more transmission parameters. The communications network can then quickly react by appropriately setting the values of the one or more transmission parameters, e.g., at a similar latency as the duration of a TTI, and informing the UE accordingly.

Data indicative of a processing load used by the UE to operate a predetermined section of at least one multi-layer communication protocol stack of a communication protocol also used for communicating higher-layer data is, hereinafter, referred to processing load data (PLD).

For example, the PLD can be indicative of an aggregated processing load to operate the predetermined section of the at least one multi-layer communication protocol stack. This means that the total processing load of multiple processes of the at least one multi-layer communication protocol stack can be determined and signaled. I.e., the predetermined section of the at least one multi-layer communication protocol stack can span multiple processes for communicating the first data. Optionally, the predetermined section can extend across multiple layers of the multi-layer communication protocol stack, i.e., span at least one layer boundary between two layers.

By not only considering a single process—e.g., decoding—in isolation, it is possible to more accurately determine whether headroom is available for adjusting the values of one or more transmission parameters. Typically, such aggregated processing load is a reliable indicator regarding the available processing headroom at the UE. The available processing headroom, in turn, is an indication regarding the ability of the UE to support certain values of one or more transmission parameters when communicating the payload data.

Such PLD can be dynamic in the sense that can depend on how the communication link between the UE and the communications network is currently setup. I.e., the PLD can be communicated while communicating payload data along the communication link; rather than prior to the set up or establishment of the communication link.

By using the PLD, it is possible to provide up-to-date information to the communications network regarding the ability of the UE to support changes in values of one or more transmission parameters. Thereby, the communications network can tailor the values of the one or more transmission parameters, e.g., to provide high data throughput, reduce energy consumption, achieve spectral efficiency and/or other goals.

A method of operating a UE is provided. The UE is connectable to a communications network. The method includes communicating first data between the UE and the communications network. The first data is communicated using at least one communication protocol. The method also includes transmitting second data to the communications network. The second data is indicative of an aggregated processing load used by the UE to operate a predetermined section of at least one multi-layer communication protocol stack of the at least one communication protocol when communicating the first data.

A computer program or a computer-program product or a computer-readable storage medium includes program code. The program code can be executed by at least one processor. Upon loading and executing the program code, the at least one processor can perform a method of operating a UE. The UE is connectable to a communications network. The method includes communicating first data between the UE and the communications network. The first data is communicated using at least one communication protocol. The method also includes transmitting second data to the communications network. The second data is indicative of an aggregated processing load used by the UE to operate a predetermined section of at least one multi-layer communication protocol stack of the at least one communication protocol when communicating the first data.

A UE includes at least one processor. The at least one processor is configured to load and execute program code. Upon executing the program code, the at least one processor is configured to communicate first data between the UE and the communication network; as well as to transmit, to the communications network, second data that is indicative of an aggregated processing load used by the UE to operate a predetermined section of at least one multi-layer communication protocol stack of the at least one communication protocol when communicating the first data.

A method of operating an access node of a communications network is provided. The method includes communicating first data using at least one communication protocol. The first data is communicated between a wireless communication device and the communications network. The method also includes receiving, from the UE, second data that is indicative of an aggregated processing load used by the UE to process the first data along a predetermined section of at least one multi-layer communication protocol stack of the at least one communication protocol.

A computer program or a computer-program product or a computer-readable storage medium includes program code that can be loaded and executed by at least one processor of an access node of a communications network. Upon loading and executing the program code, the at least one processor performs a method. The method includes communicating first data using at least one communication protocol. The first data is communicated between a wireless communication device and the communications network. The method also includes receiving, from the UE, second data that is indicative of an aggregated processing load used by the UE to process the first data along a predetermined section of at least one multi-layer communication protocol stack of the at least one communication protocol.

An access node of a communications network includes at least one processor. The at least one processor is configured to load and execute program code. Upon loading and executing the program code, the at least one processor is configured to communicate, using at least one communication protocol, first data between a UE and the communications network. The at least one processor is also configured to receive, from the UE, second data that is indicative of an aggregated processing load used by the UE to process the first data along a predetermined section of at least one multi-layer communication protocol stack of the at least one communication protocol.

It is to be understood that the features mentioned above and those yet to be explained below may be used not only in the respective combinations indicated, but also in other combinations or in isolation without departing from the scope of the disclosure.

DETAILED DESCRIPTION OF EMBODIMENTS

Figure 1:
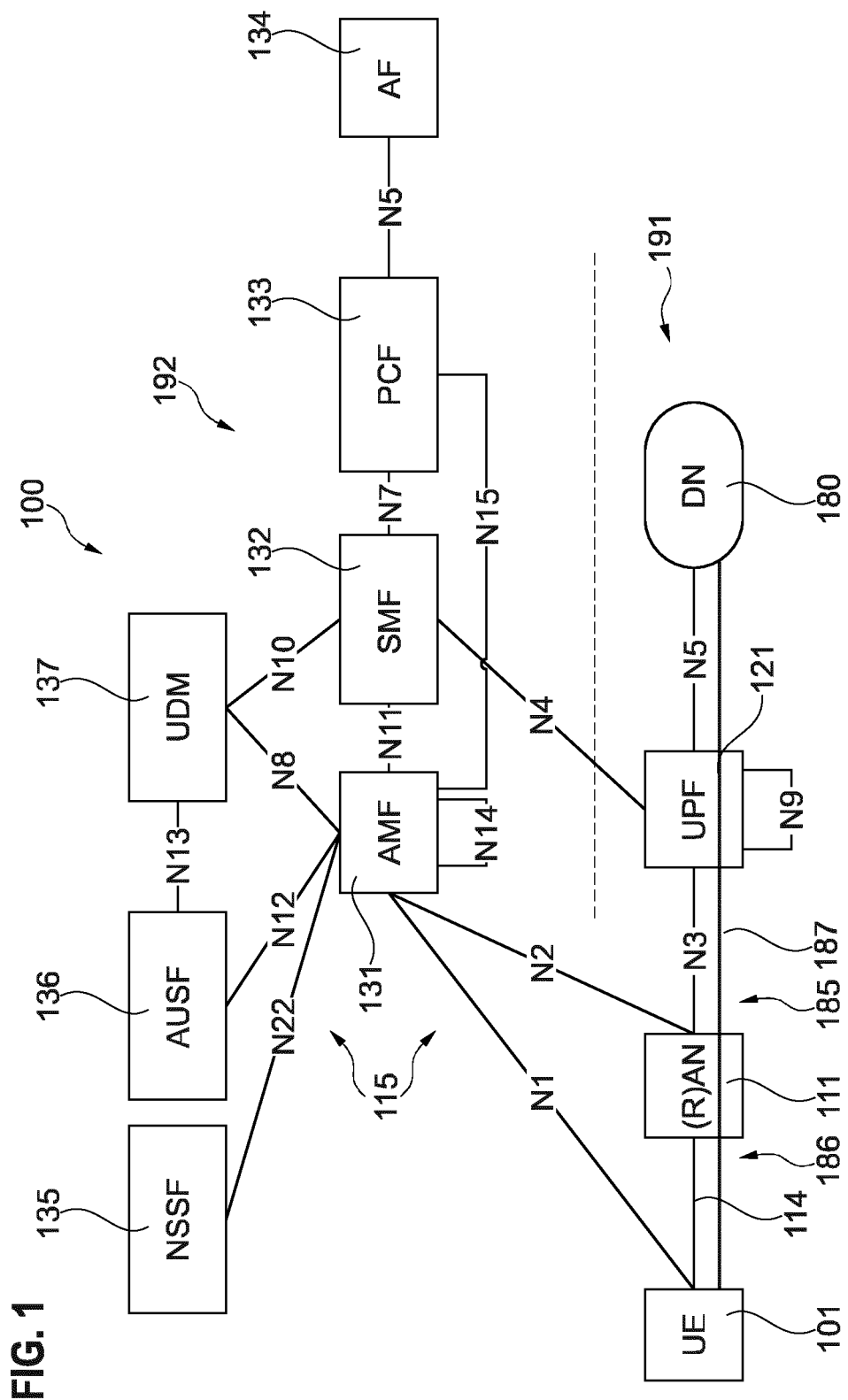
FIG. 1 schematically illustrates a UE and a cellular network according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the disclosure will be described in detail with reference to the accompanying drawings. It is to be understood that the following description of embodiments is not to be taken in a limiting sense. The scope of the disclosure is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques pertain to communicating payload data between a UE and a communications network. For instance, the communications network can be implemented by a cellular network comprising multiple base stations of a radio access network, forming cells. For sake of simplicity, details are described hereinafter with respect to such an implementation of the communications network as a cellular network (NW).

The cellular NW may be operating according to a 3GPP communication protocol, e.g., NR.

For instance, uplink (UL) payload data may be communicated from the UE to the cellular NW. It is also possible to communicate downlink (DL) payload data from the cellular network to the UE.

The payload data is generally native to Layer 3 of a communication protocol stack of a communication protocol used for said communicating between the UE and the cellular network. This means that the payload data is generated by and directed to processes operating on Layer 3, or higher layers of the communication protocol stack.

This definition of Layer 3 or higher can be in accordance with a definition of the OSI model. The OSI model is a conceptual model that characterizes and standardizes the various processes used in a wireless communication systems, agnostic of its underlying internal structure and technology. For instance, the payload data can be originating on the Network Layer, i.e., Layer 3. It would also be possible that the payload data originates at the Application layer, Layer 7. The OSI model is described by the International Standard of the International Standard Organization 7498-1, corrected and reprinted 1996-06-15. Details with respect to the OSI model are described in connection with FIG. 2. Examples of payload data include RRC control messages and application data.

For example, Layer 3 is the Network Layer according to the OSI model that provides processes for transferring packets between multiple networks where each node has a specific address. This may be achieved by using a data connection that is set up and maintained by the two nodes. For example, for a 3GPP NR communication protocol, such functionality may be provided by RRC control messages. For example, fragmentation would be one process that can be implemented at Layer 3. Protection of message delivery as a further process provided by Layer 3, e.g., using an Automatic Repeat Request (ARQ) protocol.

Various techniques are based on the finding that various communication protocols, such as the 3GPP NR communication protocol, are extremely flexible. I.e., it is possible to change between values of one or more transmission parameters such as subcarrier spacings, use bandwidth parts, transmission and reception beams, quality of service levels, etc., even on a short time scales, e.g., from transmission interval to the transmission interval.

Various techniques are further based on the finding that different types and kinds of UEs exist. There can be types of UEs that, to a large extent, are executing "software defined radios" or other functionalities where one or more of the capabilities of the UE are, to a significant extent, limited by the available computational capability and one or more processing and/or memory units, rather than a static hardware limitation. Such functionalities may be related to the capabilities of the UE such as combinations of various sets of capabilities, but it may also be related to the performance of the UE such as the internal UE processing times impacting the signaling protocol timings and delays, etc.

More specifically, various techniques are based on the finding that it can be helpful to provide PLD to the cellular NW, the PLD being indicative of an aggregated processing load used by the UE to operate a predetermined section of at least one multi-layer communication protocol stack of at least one communication protocol when communicating payload data.

According to the various examples disclosed herein, a predetermined section can comprise one or more processes in one or more layers of the multi-layer communication protocol stack. The predetermined section can include one or more parts of one or more layers of the multi-layer communication protocol stack. The different processes or parts could be defined in accordance with the OSI model, e.g., implement different functionalities associated with each one of the multiple layers.

Alternatively or additionally to determining the aggregated processing load to operate an extended section of multiple processes of the at least one multi-layer communication protocol stack, also a time-average may be considered. For example, it would be possible that the aggregated processing load is determined based on one or more averaged characteristics of an operation of the at least one multi-layer communication protocol stack. The averaged characteristics can be averaged across a predetermined time interval that includes, e.g., multiple transmission time intervals—such as subframes—of the at least one communication protocol. By such time-averaging to obtain the aggregated processing load, instantaneous spikes can be is filtered to some extent. This can be associated with applying a low-pass filter.

The cellular NW can benefit from having the instantaneous indication of from the UE regarding the aggregated processing load, by performing very quick adaptation of the network settings, e.g., changing values of one or more transmission parameters, to match the current computational loads. This could be especially beneficial in light of the ever-growing width of different services from many different industry verticals being driven towards mobile communication standardization.

As a general rule, the UE can transmit and/or receive (communicate), using a least one communication protocol, first data between the UE and the communications network. The UE can transmit, to the communications network, second data that is indicative of an aggregated processing load used by the UE to operate a predetermined section of at least one multi-layer communication protocol stack of the at least one communication protocol when communicating the first data. An access node of the communications network and can received the second data. The access node can process the second data to configure communicating the first data.

The first data can be payload data—i.e., native to Layer 3 or higher—and the second data can be PLD. This terminology is adhered, hereinafter.

For example, the PLD could be native to Layer 1. This means, that the process operating on Layer 1 can determine the content of the PLD and encode the PLD into respective symbols. This can help to accelerate transmission of the PLD. For instance, it is not required to provide ARQ protection for the PLD, because ARQ protection would be native to Layer 2. Segmentation or aggregation into protocol data units on Layer 2 is not required. Thereby, fast updates regarding the aggregated processing load can be provided.

The PLD can be repeatedly transmitted. More specifically, multiple instances of the PLD can be transmitted in pre-allocated re-occurring resources of an UL control channel between the UE and the cellular NW. The information content of the PLD can change from instance to instance, along with variations in the aggregated processing load. I.e., the aggregated processing load signal to the cellular NW can change over the course of time as multiple instances of the PLD are transmitted.

In this regard, would be possible to monitor the operation of the at least one multi-layer communication protocol stack used for communicating the payload data and then repeatedly determine the aggregated processing of based on said monitoring. Then, the multiple instances of the PLD can be determined based on said repeatedly determining of the aggregated processing load.

As a general rule, there are various implementations conceivable to determine the aggregated processing load. For instance, it would be possible to rely on a predefined mapping between values of one or more transmission parameters currently used for communicating the payload data and respective aggregated processing loads. In other words, the UE may have knowledge regarding the use processing loads for certain values of one or more transmission parameters. It would also be possible to monitor for the processing threads used to implement one or more processes of the multi-layer communication protocol stack, e.g., memory fill levels, idling of computational units etc.

The resources can be time-frequency resources of a time-frequency resource grid. For instance, a Physical Uplink Control Channel (PUCCH) may include certain re-occurring resources occurring, e.g., every TTI or every second TTI, etc. that will be used for transmitting the PLD. This alleviates the need to perform on demand scheduling resources for the transmission of the PLD; thereby, further reducing a latency required to transmit the PLD. Thereby, fast updates regarding the aggregated processing load can be provided.

The PLD may e.g. be included in the physical uplink control channel (PUCCH), e.g., as part of so-called "uplink control information—UCI" in the physical layer specifications. Other channels and control information types are also possible, e.g. transmissions included/piggybacked into a data channel or similar. As of now, in 3GPP the UCI includes e.g. channel quality information, amount of data the UE intends to transmit (buffer status report) positive and/or negative acknowledgements for DL data and similar information.

The transmission of the PLD may be limited to certain scenarios. For instance, the PLD may be transmitted only when low-latency communication is being used for the payload data. This may be indicated by the network, e.g. in system information or RRC signaling for configuration. A scenario for low latency communication may be when so-called slot-based communication is used. Another scenario for low latency communication may be in a scenario when a gaming or VR/AR application is running in the UE. As a general rule applicable to the various examples disclosed herein, it would be possible that such re-occurring resources are persistently scheduled, e.g., as long as a data connection is being set up between the UE and the cellular NW for communicating the payload data. Then, multiple instances of the PLD can be continuously transmitted. It would also be possible that the PLD is selectively transmitted in response to a least one trigger event. Here, it would be possible that the re-occurring resources are scheduled in response to the at least one trigger event; or are pre-allocated.

As a general rule, various trigger events that could trigger said transmitting of the PLD are conceivable. Some trigger events are summarized in TAB. 1 below.

TABLE 1

Various options for trigger events used to trigger transmitting of the PLD.
Trigger events as provided as examples in TAB. 1 can be combined with other
trigger events or with each other, to form aggregated trigger events.

| Example | Brief description | Example details |
|---------|-------------------|-----------------|
| I | Slotted transmission | For instance, the PLD may be transmitted if a slaughter transmission is used for communicating the payload data. Slotted transmission is a low-latency technology that uses mini-slots for scheduling. An example would be 3GPP NR Ultra-Reliable and Low-Latency Communications (URLLC). Here, a scheduling unit is shorter than a slot, i.e., shorter than half a subframe. The scheduling unit is referred to as a mini slot. A resource grant can be received within a slot for resources within that very slot. Thereby, low-latency data - e.g., at latencies below 1 ms - can be transmitted. Details are described in 3GPP TR 38.912, Version 15.0.0 (2018-06). |
| II | Application type | Alternatively or additionally, the PLD may be transmitted if the payload data is associated with a certain pre-defined application, e.g., a low-latency applications or na application having certain predetermined Quality of Service (QOS) requirements. An example of a low latency applications would be a Virtual Reality gaming application. |
| III | Communication capability of UE | Yet another example would be a change in a communication capability of the UE. Typically, changes in the communication capability of the UE occur on a significantly longer timescale of compared to fast changes in the channel between the UE and the cellular NW; fast changes in the channel, the other hand, have a direct impact on values of one or more transmission parameters |

TABLE 1-continued

Various options for trigger events used to trigger transmitting of the PLD.
Trigger events as provided as examples in TAB. 1 can be combined with other
trigger events or with each other, to form aggregated trigger events.

| Example | Brief description | Example details |
| --- | --- | --- |
|  |  | used for communicating the payload data, e.g., modulation constellation, etc. In turn, fast changes in the channel can have a direct impact on the aggregated processing required to communicate the payload data. Accordingly, while the aggregated processing load changes on a fast timescale, the UE capability may change on a slow timescale and, hence, such changes can be used as a trigger event for triggering transmitting the PLD. |
| IV | Setup of a data connection | The PLD can be transmitted when operating in connected mode, i.e., having a data connection setup and established with the communications network. The payload data can be communicated using the data connection. |
| V | PLD-dependent trigger criterion | For instance, the trigger may be based on the information content of the PLD. For example, the trigger may be the value of the agrregated processing load. In such case, the PLD may be transmitted only when the aggregated processing load is above or below a pre-determined threshold value. This may be beneficial to indicate only when a very high UE processing load is reached and the UE may be able to reduce its PLD if a different configuration is applied by the network. Other triggers may be not dependent on the information content of the PLD, e.g., as described above in connection with respect to examples I-IV. |

As a general rule, various information can be included in the PLD. Some options are summarized below in TAB. 2.

TABLE 2

Various information content of the PLD. It would be possible that the
PLD includes multiple such information elements. The PLD can indicate
such information by using a predefined codebook, e.g., using a bitmap
that maps to respective values in accordance with the codebook.

|  | Example of information included in PLD | Example description |
| --- | --- | --- |
| I | Indicator quantifying aggregated processing load | For instance, the processing load could be explicitly quantified, e.g., in processing operations per TTI or other time interval. Another measure quantifying an aggregated processing load could be buffer for levels. Depending on the particular aggregated processing load considered, different buffers, e.g., residing on different layers of the respective multi-layer communication protocol stack can be considered. A higher buffer for level generally indicates a higher aggregated processing load, thereby resulting in backlog. |
| II | Indicator quantifying processing headroom | It would be possible to explicitly indicate the amount of available, unused computational resources. Such unused computational resources can be used to support adjusted values of one or more transmission parameters, i.e., values different to the values currently used for communicating the payload data. |
| III | ARQ-related information | The aggregated processing load can include at least a contribution specifying the computational resources required to implement an ARQ process, e.g., to check whether a certain data packet at Layer 2 has been correctly received, e.g., including an error correction checksum check, and to generate a respective positive or negative acknowledgement. The predetermined section of the at least one multi-layer communication protocol stack can, thus, at least include a part of Layer 2 operating the ARQ process. |

TABLE 2-continued

Various information content of the PLD. It would be possible that the PLD includes multiple such information elements. The PLD can indicate such information by using a predefined codebook, e.g., using a bitmap that maps to respective values in accordance with the codebook.

| | Example of information included in PLD | Example description |
|---|---|---|
| | | For example, it would be possible to indicate, in the PLD, the current headroom for parallel hybrid ARQ processes, e.g., for supporting multiple logical links, each logical link employing its own hybrid ARQ process. For example, the PLD could be indicative of a delay to generate a positive or negative acknowledgement of the ARQ process. The delay can be caused by the aggregated processing load, i.e., higher loads can cause longer delays. Depending on the definition of the predetermined section of the respective multi-layer communication protocol stack implementing the ARQ process, the definition of this delay may vary. For instance, would be possible that the predetermined section is defined from a bottom part of Layer 1, cross the boundary between Layer 1 and Layer 2, up to the ARQ process; and, the delay would be defined in terms of receiving a signal, demodulating and decoding the signal, passing respective bits up to Layer 2 until completing the ARQ process. In another example, it would be possible that the predetermined section of the respective multi-layer communication protocol stack implementing the ARQ process is defined from the bottom part of Layer 2 up to the ARQ process; then, potential congestion at Layer 1 would not affect the delay indicated by the PLD, because these Layer 1 delays would not affect the aggregated processing load considered in this example. |
| IV | Timing parameter | The PLD can be tied to one or more timing parameters, e.g., information how long the UE required to complete certain tasks. These timing parameters can be associated with the delays caused by non-zero values of the aggregated processing load. An example timing parameter has already been explained in example III of TAB. 2, in connection with respect to the delay for providing the PACK or NACK of the ARQ process. There are other examples of timing parameters conceivable. For example, a decoding delay could be considered, as will be explained in example V below. |
| V | Layer 1, demodulation and decoding process | It would be possible that the predetermined section for which the aggregated processing load indicated by the PLD is signaled includes at least demodulation and decoding of data blocks of the payload data at Layer 1. A UE data decoding delay can denote the required time in the UE from receiving a data packet at the lower edge of Layer 1 from the cellular network, until passing respective bits up to Layer 2. By signaling such decoding delay, it is possible to inform of any headroom and the ability of the UE to support and adjusted setting of the demodulation and/or decoding process. |
| VI | Layer 1, beam management process | It would be possible that the PLD is indicative of a delay in commanding and executing a switch between two beams at the UE, e.g., transmit beams and/or receive beams, when communicating the application data. This delay can because by the aggregated processing load, i.e., limited computational resources may be available so that - e.g., in the context of a software-defined radio - commanding and executing a beam switch can take a certain time. |

TABLE 2-continued

Various information content of the PLD. It would be possible that the PLD includes multiple such information elements. The PLD can indicate such information by using a predefined codebook, e.g., using a bitmap that maps to respective values in accordance with the codebook.

| | Example of information included in PLD | Example description |
|---|---|---|
| VII | Layer 1, frequency management | A respective process for beam management is typically implemented at Layer 1. Thus, the predetermined section of the respective multi-layer communication protocol stack can include at least a respective part of Layer normal 1. It would be possible that the PLD is indicative of a delay in commanding and executing a switch between two frequency bands at the UE. This delay can be caused by the aggregated processing load. For instance, limited computational resources may be available so that - e.g., in the context of a software-defined radio - commanding and executing a switch from a first frequency band to a second frequency band can take a certain time, i.e., subject to a delay. For instance, before a respective command can be provided to a hardware controller executing retuning of are filters, a respective thread may be started in a computational unit, which requires computational resources that can be limited in view of the aggregated processing load. A respective process for frequency re-tuning is typically implemented at Layer 1. Thus, the predetermined section of the respective multi-layer communication protocol stack can include at least a respective part of Layer normal 1. |
| VIII | RRC control signaling delay | It would be possible to signal the aggregated processing load by specifying a maximum supported data rate for handling the payload data along the section of the at least one communication protocol stack between the lower edge of Layer 1 and a predetermined point in Layer 3. For instance, RRC control messages - native to Layer 3 of the respective multi-layer communication protocol stack - can be used to schedule time-frequency resources and the time-frequency resource grid for communicating payload data. Accordingly, a respective latency for scheduling and allocating such time-frequency resources may be defined by the delay from the lower edge of Layer normal one up to a scheduling process implemented at Layer 3. |
| IX | Information for multiple logical links | For instance, where multiple logical links are established between the UE and the cellular network, it would be possible that the PLD provides a breakdown of respective information e.g., according to any other example discussed in this TAB. - associated with each one of the multiple logical links. It would also be possible that the PLD only provides the aggregated processing load summed across the multiple logical links. For instance, such information may be provided from the bottom edge of Layer 1 up to a bonding point between the multiple logical links. The bonding point defines the point where data streams associated with the multiple logical links are joined together. Processes arranged in the protocol stack above the bonding point are shared between the multiple logical links; processes arranged below the bonding point are implemented for each logical link individually. |

TABLE 2-continued

Various information content of the PLD. It would be possible that the
PLD includes multiple such information elements. The PLD can indicate
such information by using a predefined codebook, e.g., using a bitmap
that maps to respective values in accordance with the codebook.

| | Example of information included in PLD | Example description |
|---|---|---|
| | | As a general rule applicable to the various examples disclosed herein, multiple logical links may, e.g., use separate communication protocol stacks implemented in parallel, and/or use multiple bandwidth parts, and/or use different communication protocols, and/or use specific antenna panels, and/or use specific beams. |
| X | Information regarding support of bandwidth part (BWP) | The PLD can indicate the aggregated processing load imposed by supporting one or more BPWs. For instance, would be possible to indicate the number of parallel BPWs that could be active and supported by the UE for communicating UL and/or DL payload data. A supported combination set of BWPs could be signaled. |
| XI | Information regarding aggregated processing load in a transmit part of the multi-layer processing stack and/or in a receive part of the multi-layer processing stack | The aggregated processing load can pertain to receiving and/or transmitting the payload data. Typically, complementary processes are used for receiving and transmitting, e.g., decoding and demodulating for receiving versus encoding and modulating for transmitting. Some processes are also interrelated, e.g., in ARQ process triggers transmission of a negative or positive acknowledgement for received sections of data. |

As a general rule, according to the various examples disclosed herein, the information content of the PLD may be determined by a reporting configuration. The reporting configuration could be determined by the cellular NW. For example, to configure the information content of the PLD, it would be possible to use a higher layer configuration mechanism. An RRC message may be used to configure the control information fields, e.g. what type of information to be provided, the granularity in number of bits to use for the indication etc. As a general rule, in the various examples described herein, such reporting configuration may be—alternatively or additionally to the information content—be indicative of a timing of repeatedly transmitting multiple instances of the PLD, re-occurring resources of an uplink control channel allocated to the PLD, and/or one or more trigger events triggering the transmitting of the PLD (cf. TAB. 1)

Applying the general framework laid out in TAB. 2, a concrete example of the PLD is shown in TAB. 3. Note that—in particular for a scenario in which the PLD is native to Layer 1—, the signaling should be as small as possible, e.g., only consisting of a few bits. TAB. 3 shows a more comprehensive implementation, while other implementations may be only a subset of the below. Many different parameter types could be envisioned, and the information in this illustration is just an example.

TABLE 3

Example implementation of the PLD.

| Applicable for | Parameter | Reported value |
|---|---|---|
| BWP 1 | Current processing time from data reception to HARQ transmission (cf. TAB. 2, example III) | Current value, e.g. 0.5 ms |

TABLE 3-continued

Example implementation of the PLD.

| Applicable for | Parameter | Reported value |
|---|---|---|
| | Receiver buffer load (cf. TAB. 2, example I) | Current value, e.g. 90% |
| BWP 2 (cf. TAB. 2, example IX) | Current processing time from data reception to HARQ transmission | Current value, e.g. 0.1 ms |
| | Receiver buffer load | Current value, e.g. 10% |
| General | Current capability for parallel HARQ processes (cf. TAB. 2, example II, IX) | Current value, e.g. 20 |
| General | Total CPU load in modem (cf. TAB. 2, example I) | Current value, e.g. 85% |
| General | Among the current configured BWPs indication which could be used for simultanous reception (cf. TAB. 2, example I, IX) | BWPs e.g: 1 + 2 + 4, 3 + 5 |

According to various examples of the disclosure, the PLD can assist the communication of the payload data, e.g., communicated on a shared channel. In particular, it is possible to set values of one or more transmission parameters of the at least one communication protocol used when communicating the application data based on the PLD and in accordance with the aggregated processing load. A respective control message can be transmitted by a network node of the cellular NW to the UE, and the UE can receive the control message that is indicative of the values of the one or more transmission parameters that are set in accordance with the aggregated processing load. Such setting of the values of the one or more transmission parameters can be implemented by logic residing at the cellular NW, based on PLD received from the UE. Then, a respective node of the cellular NW can transmit a control message to the UE that is indicative of the values of the one or more transmission parameters set in accordance with the PLD. Thereby, it is possible to accurately and quickly adjust the values of the one or more transmission parameters to the operating conditions at the UE, specifically, the aggregated processing load. For instance, it would be possible to take into account a processing headroom of unused computational resources available in view of the aggregated processing load.

When setting values of one or more transmission parameters, it is also possible to take into account the capability of the UE. The capability of the UE may be signaled separately from the PLB. For instance, the capability of the UE may be signaled in a Layer 3 RRC control message, e.g., upon establishing a data connection used for communicating the payload data. A capability control message may be native to a higher layer if compared to the PLD. The capability of the UE may provide for boundary conditions, e.g., acceptable ranges, within which the values of the one or more transmission parameters can be fine-tuned based on the PLD.

More generally, based on the PLD, the cellular NW can monitor the UE operations. The cellular NW can adjust its operation and communication of data—e.g., the payload data—accordingly.

For instance, it would be possible that the cellular NW operates a monitoring algorithm, e.g., to predict an aggregated processing load at a future point in time. This monitoring algorithm could implement machine learning, e.g., reinforcement learning, based on multiple instances of the PLD received over the course of time from the UE. By implementing such prediction, it would be possible to prospectively adjust the values of the one or more transmission parameters, so as to avoid the UE running out of resources or other malfunctioning at the UE.

Thus, as will be appreciated from the above, the cellular NW can benefit from receiving the PLD when adapting the radio protocol signaling for the communicating the payload data. Specifically when the communication of the payload data is targeting very low latency communication and/or very high reliability (such as URLL, as an example of slotted transmission discussed above), the UE and cellular NW may want to optimize the values of one or more transmission parameters such as subcarrier spacing, transmission time interval, hybrid ARQ parameters (number of repetitions, time in-between data transmission and ack/nack signaling or similar), modulation, coding, parallel transmissions (dual connectivity, multiple, overlapping transmissions on several BWPs or other types of redundancy based multiple transmissions) to meet as high performance as possible considering what the UE is capable of in that particular occasion.

As a general rule, the techniques described herein can be used to set values of various kinds and types of transmission parameters. Some examples of transmission parameters for which values can be adjusted based on the PLD are summarised below in TAB. 4.

TABLE 4

Various options for transmission parameters for which values can be (re-)set based on the PLD.

| | Transmission parameter | Example description |
|---|---|---|
| I | Data rate of the application data | For instance, the amount of data encoded into symbols of a transmission time interval, e.g., by allocating more resources or increasing a modulation constellation (bit loading) can be adjusted. Typically, a higher amount of data encoded into symbols of transmission time interval requires more computational resources for team are relating and decoding and further processing at higher layers of the communication protocol stack. |
| II | Modulation and/or coding scheme of the application data | Demodulation and/or coding scheme can be set to different values. For instance, the modulation can specify the constellation. The coding scheme can specify properties such as scrambling, interleaving, checksums, etc. |
| III | Subcarrier spacing | For Orthogonal Frequency Division Multiplex (OFDM) modulation, the spacing between adjacent subcarriers can be adjusted. Typically, for a smaller subcarrier spacing, i.e., a larger count of subcarriers per carrier, the required computational load will increase. Thus, higher computational headroom may be required to support a lower subcarrier spacing. |
| IV | Transmission time interval duration | For instance, different durations of transport blocks as a possible implementation of transmission time intervals may be set by the cellular network. |
| V | Configuration of ARQ process | It would be possible to set properties of an ARQ process, e.g., batch acknowledgements, explicit or implicit positive feedbacks, etc. |
| VI | Count of parallel logical links | It would be possible to implement multiple logical links between the UE and the cellular network (cf. TAB. 2, example IX). Each logical link may be characterized, at least, by its own instance of the lower part of the Layer 1 of a respective communication protocol stack. Each logical link may implement a respective section of a communication protocol stack. The different sections are bonded at some point. Different logical links can employ the same or different communication protocols, the same or different ARQ protocols, the same or different |

TABLE 4-continued

Various options for transmission parameters for
which values can be (re-)set based on the PLD.

| Transmission parameter | Example description |
| --- | --- |
| | bandwidth parts or frequencies. Typically, a larger count of parallel logical links will impose a higher processing load. |
| VII Full-duplex | The activation or deactivation of full duplex (transmitting and receiving contemporaneously) can be set. |

FIG. 1 schematically illustrates a communication system 99, including a UE 101, a cellular NW 100, and a data network (DN) 180, e.g., an IMS NW. The example of FIG. 1 illustrates the cellular NW 100 according to the 3GPP 5G architecture. Details of the 3GPP 5G architecture are described in 3GPP TS 23.501, version 15.3.0 (2017-09).

While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-10T framework—and even non-cellular wireless systems, e.g., an IEEE Wi-Fi technology.

In the scenario of FIG. 1, a UE 101 is connectable to the cellular NW 100. For example, the UE 101 may be one of the following: a cellular phone; a smart phone; an IOT device; a MTC device; a sensor; an actuator; etc.

The UE 101 is connectable to a CN 115 of the cellular NW 100 via a RAN 111, typically formed by one or more BSs 112 (only a single BS 112 is illustrated in FIG. 1 for sake of simplicity). A wireless link 114 is established between the RAN 111—specifically between one or more of the BSs 112 of the RAN 111—and the UE 101. The wireless link 114 can include one or more spatial streams to carry data over the air. The wireless link 114 can also be labeled radio channel.

The wireless link 114 (or radio channel) implements a time-frequency resource grid. Typically, Orthogonal Frequency Division Multiplexing (OFDM) is used: here, a carrier includes multiple subcarriers. The subcarriers (in frequency domain) and the symbols (in time domain) then define time-frequency resource elements of the time-frequency resource grid. Thereby, a time base of the communication protocol is defined, e.g., by the duration of frames and subframes—as examples of TTIs—including multiple symbols and the start and stop positions of the frames and subframes. Different time-frequency resource elements can be allocated to different logical channels or reference signals of the wireless link 114. Examples include: Physical Downlink Shared Channel (PDSCH); Physical Downlink Control Channel (PDCCH); Physical Uplink Shared Channel (PUSCH); Physical Uplink Control Channel (PUCCH); channels for random access; etc.

The CN 115 includes a user plane (UP) 191 (oftentimes also referred to as data plane, DP) and a control plane (CP) 192. Application payload data of a data transfer is typically routed via the UP 191. The data transfer can be associated with a bearer 185. The bearer 185 comprises a data connection 186 on the wireless link 114 that is established once the UE 101 operates in the connected mode.

Forwarding of data along the bearer 185 is handled by a UP function node (UPF) 121 in the UP 191. The UPF 121 may implement router functionality. The UPF 121 implements a gateway node. In the scenario of FIG. 1, the UPF 121 acts as a gateway with respect to a data NW 180, e.g., the Internet or a Local Area NW or an IMS NW. Application data of a data transfer can be communicated between the UE 101 and one or more servers on the data NW 180.

The cellular NW 100 also includes a mobility-control node, here implemented by an Access and Mobility Management Function (AMF) 131 and a Session Management Function (SMF) 132.

The cellular NW 100 further includes a Policy Control Function (PCF) 133; an Application Function (AF) 134; a NW Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; Non-access stratum (NAS) termination for communication between the CN 115 and the UE 101; connection management; reachability management; mobility management; connection authentication; and connection authorization.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The bearer 185—that can be used to support a data transfer, i.e., deliver payload data—is established by the SMF 132 if the respective UE 101 operates in a connected mode. Accordingly, the SMF 132 can implement a session control node. The bearer 185 is characterized by UE subscription information hosted by the UDM 137. To keep track of the current mode of the UE 101, the AMF 131 sets the UE 101 to CM-CONNECTED or CM-IDLE. During CM-CONNECTED, a non-access stratum (NAS) connection is maintained between the UE 101 and the AMF 131. The NAS connection implements an example of a mobility control connection. The NAS connection may be set up in response to paging of the UE 101. The data connection 186 is characterized by the values chosen for multiple transmission parameters, cf. TAB 4. The data connection 186 is negotiated and set-up on the RRC layer, e.g., generally Layer 3 of the OSI model. Next, details with respect to a communication protocol stack and the OSI model framework are discussed in connection with FIG. 2.

Figure 2:
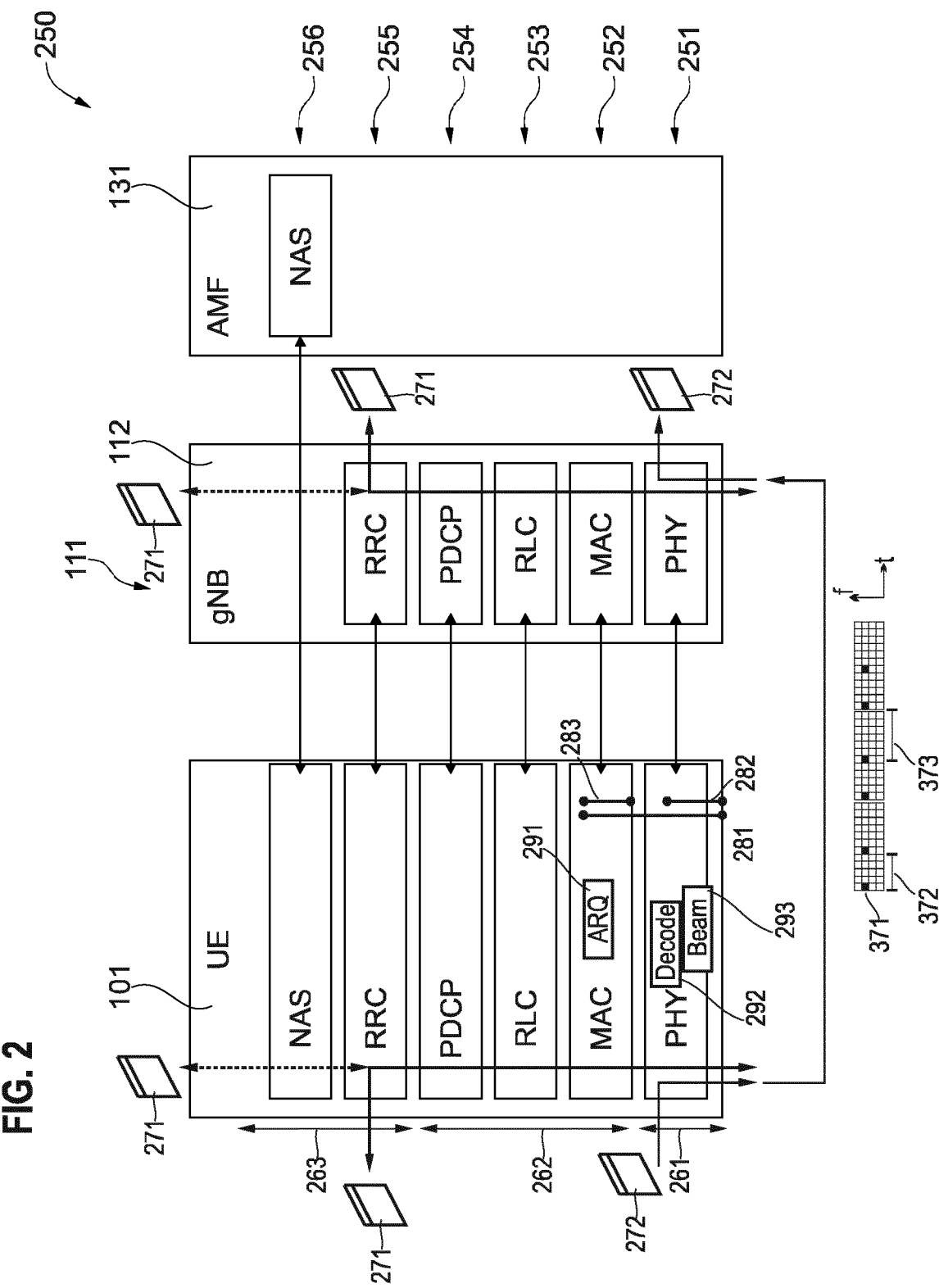
FIG. 2 schematically illustrates a communication protocol stack according to various examples.

FIG. 2 illustrates aspects with respect to a multi-layer communication protocol stack 250. The communication protocol stack 250 is configured according to a 3GPP 5G NR communication protocol. Other communication protocols can use other communication protocol stacks that, however, can all be mapped to the OSI model.

The transmission protocol stack 250 includes a PHY layer 251. The PHY layer 251 implements Layer 1 261 according to the OSI model. The PHY layer 251 implements the following processes: modulation; coding; beam management; frequency switching; multiplexing; etc.

Layer 1 261 implements processes for transmission and reception of unstructured raw data between the UE 101 and the BS 112 and a physical transmission medium. It converts the digital bits into radio signals. The respective transmission parameters define voltage levels, the timing of voltage changes, physical data rates, maximum transmission distances, modulation scheme, channel access method and physical connectors. Bit rate control may define transmission mode as simplex, half duplex, and full duplex.

The transmission protocol stack 250 includes a Medium Access (MAC) layer 252, an Radio Link Control (RLC) layer 253 and a Packet Data Convergence Protocol (PDCP) layer 254. These layers 252-254 implement Layer 2 262 according to the OSI model.

Layer 2 262, according to the OSI model, provides data transfer between the UE 101 and the BS 112. Processes are provided to detect and correct errors that may occur in the Layer 1 261.

The RLC layer 253 provides for one or more of the following processes: error correction using an Automatic Repeat Request (ARQ) protocol, segmentation and reordering of protocol data units, scheduling, etc.

The MAC layer 252 provides for one or more of the following processes: control of access to the physical transmission medium, framed the limiting and recognition; etc.

The PDCP layer 254 provides one or more of the following processes: transfer of application data and control data; header compression such as robust header compression (RoHC); Access Stratum (AS) level security.

A RRC layer 255 implements Layer 3 263 according to the OSI model and provides for control signalling functionality between the UE 101 and the BS 112; also, additional Layer 3 263 functionalities are implemented by the NAS layer 256 which provides for control signalling functionality between the UE 101 and the AMF 131.

The RRC layer 255 provides one or more of the following processes: establishment and release of the data connection 186 and, generally, the bearer 185; paging notification; broadcasting of system information; transmitting a control message indicative of a UE capability regarding the support of certain values of one or more transmission parameters.

Likewise, also the NAS layer 256 provides for functionality associated with one or more of the following, with respect to signalling towards the core network: bearer establishment and release; mobility control; identity management.

Not illustrated in FIG. 2 is an application layer (e.g., Layer 7), a presentation layer (e.g., Layer 6), a session layer (e.g., Layer 5), and a transport layer (e.g., Layer 4), all stacked upon Layer 3 263 according to the OSI model.

FIG. 2 also illustrates aspects with respect to payload data 271. Payload data 271 could be, e.g., RRC control data that is native to Layer 3 263 according to the OSI model, more specifically the RRC layer 255, as illustrated. The payload data 271 could also be native to higher layers, e.g., Layer 7, i.e., could be application payload data. As a general rule, such payload data 271 can be communicated along the data connection 186 on the wireless link 114. For instance, the payload data can be communicated on PUSCH or PDSCH. The payload data 271 can be communicated in the uplink and/or the downlink.

FIG. 2 also illustrates aspects with respect to the PLD 272. The PLD 272 is generated by a respective process that operates on Layer 1 261, i.e., the PHY layer 251. The PLD 272 is entered into/extracted from the data stream at this position. FIG. 2 also illustrates pre-allocated time-frequency resources 371 (black symbols) in TTIs—e.g., subframes—allocated for transmission of the PLD 272. The pre-allocated resources are re-occurring at periodicities 372, 373; other configurations for reoccurring timings are conceivable. Pre-allocated means that a single scheduling message can define the re-occurring resources for multiple repetitions.

FIG. 2 also illustrates aspects with respect to predetermined sections of the multi-layer communication protocol stack.

For example, the section 281 spans the boundary between Layer 1 261 and Layer 2 262 and, therefore, spans multiple processes implemented on these layers. For illustration, the ARQ process 291, a beam management process 292, and a decoding process 293 are all spanned by the section 281.

Differently, the section 282 only spans the beam management process 293 (cf. TAB. 2, example VI) and the section 283 only spans the ARQ process 291 (cf. TAB. 2, example III). According to the various examples described herein, it is possible to flexibly configure the predetermined section to include/exclude certain processes of the multi-layer communication protocol stack 250.

Using such sections 281-283, it is possible to determine delays, caused by the aggregated processing load of all processes along these sections 281-283, to complete passing data through these sections 281-283.

While FIG. 2—for sake of simplicity—only illustrates the processes 291-293, as a general rule, the multi-layer communication processing stack 250 includes many more processes.

Figure 3:
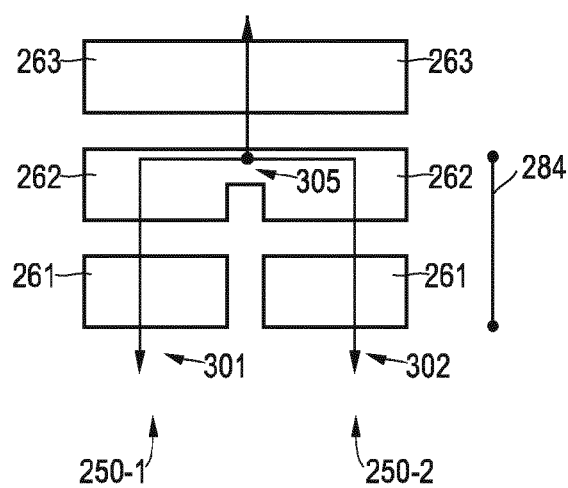
FIG. 3 schematically illustrates multiple logical links using multiple communication protocol stacks that are bonded according to various examples.

FIG. 3 schematically illustrates aspects with respect to using multiple multi-layer communication protocol stacks 250-1, 250-2, to thereby implement multiple logical links 301, 302. In the scenario of FIG. 3, the logical links 301, 302 are bonded at the bonding point 305 residing in the Layer 2, e.g., above the at the boundary between the RLC layer 253 and the MAC layer 252 (other positions of the bonding point 305 are generally possible). Data streams transmitted along are fused at the bonding point 305. This means that all processes below the bonding point 305 are duplicated and each logical link 301, 302 has the own instance of the respective processes. Examples would pertain to the processes 291-293 as discussed above in connection with FIG. 2, all arranged below the bonding point 305 of the illustrated example.

As a general rule, the multiple logical links 301, 302 can implement the same communication protocol or can use different communication protocols, e.g., 3GPP NR in combination with 3GPP Long Term Evolution (LTE) or IEEE Wi-Fi.

Illustrated in FIG. 3 is a scenario in which a predetermined section 284 for the purpose of determining the aggregated processing load spans up to the bonding point 305 (cf. TAB. 2, example IX). Such a definition of the predetermined section 284 can be helpful to judge whether further logical links could be established in parallel (i.e., a count of logical links) or whether the count of logical links should be reduced; a respective transmission parameter can be set accordingly.

Figure 4:
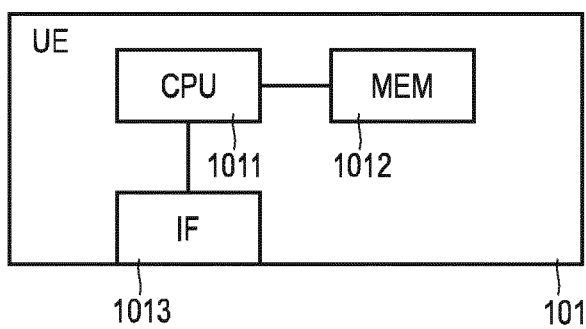
FIG. 4 schematically illustrates a UE according to various examples.

FIG. 4 schematically illustrates the UE 101. The UE 101 includes a processor 1011 and a memory 1012, together implementing a control circuitry. The UE 101 also includes a communication interface 1013 that can be used by the UE 101 to communicate with other nodes, e.g., by accessing the wireless link 114, using a NAS connection or a RRC connection or a data connection such as the data connection 186. The processor 1011 can load program code from the memory 1012 and execute the program code. Upon executing the program code, the processor 1011 performs techniques as described herein such as: operating a multi-layer protocol stack; monitoring operation of a multi-layer communication protocol stack such as one of the multi-layer communication protocol stacks 250, 250-1, 250-2; determining an aggregated processing load for multiple processes in a predetermined section of the multi-layer communication protocol stack, cf. sections 281-284; transmitting and/or or receiving (communicating) first data, e.g., payload data such as RRC control messages or application payload data (cf. payload data 271 in FIG. 2), e.g., on PDSCH and/or PUSCH; transmitting second data that is indicative of an aggregated processing node (cf. PLD 272 in FIG. 2); transmitting a control message indicative of a capability of the UE; receiving a control message indicative of values of one or more transmission parameters and implementing these values for communicating the first data; etc.

Figure 5:
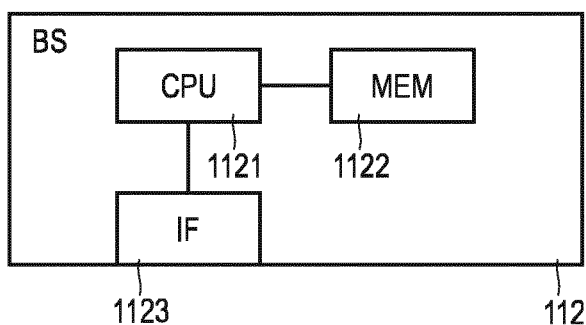
FIG. 5 schematically illustrates a base station according to various examples.

FIG. 5 schematically illustrates the BS 112. The BS 112 includes a processor 1121 and a memory 1122, together implementing a control circuitry. The BS 112 also includes a communication interface 1123 that can be used by the BS 112 to communicate with other nodes, e.g., by accessing the wireless link or using an RRC connection or a data connection such as the data connection 186. The processor 1121 load program code from the memory 1122 and execute the program code. Upon executing the program code, the processor 1121 performs techniques as described herein, such as: receiving a capability control message indicative of a capability of a UE from the UE; transmitting and/receiving (communicating) first data, e.g., payload data such as RRC control messages or application payload data (cf. payload data 271 in FIG. 2), e.g., on PDSCH and/or PUSCH; receiving the second data that is indicative of an aggregated processing load (cf. PLD 272 in FIG. 2); setting more specifically adjusting values of one or more transmission parameters for communicating the first data based on the second data and optionally based on the capability of the UE; transmitting a control message indicative of the values of the one or more transmission parameters and implementing these values for communicating the first data; etc.

Figure 6:
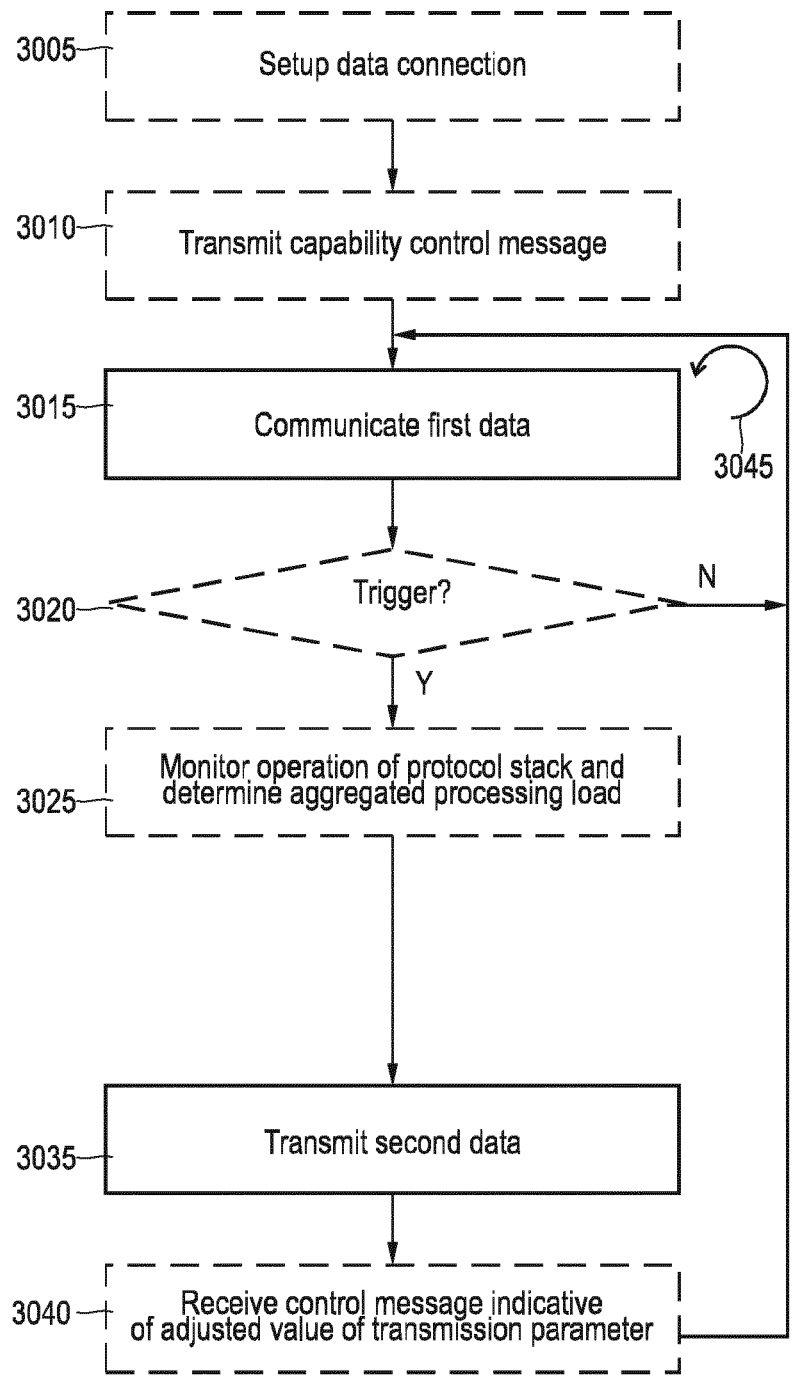
FIG. 6 is a flowchart of a method according to various examples.

FIG. 6 is a flowchart of a method according to various examples. The method of FIG. 6 can be implemented by a UE such as the UE 101. The UE is connectable to a cellular NW or another communications NW. More specifically, it would be possible that the method of FIG. 6 is executed by the processor 1011 upon loading respective program code from the memory 1012. Optional boxes are illustrated using dashed lines in FIG. 6.

At optional box 3005, a data connection—such as the data connection 186—is set up. This can include a random access procedure and an RRC connection establishment procedure.

At optional box 3010, a capability control message is transmitted. The capability control message is indicative of a capability of the UE to support values of one or more transmission parameters for communicating data on the data connection that is set up in box 3005. For instance, the capability control message could indicate certain acceptable modulation and coding schemes, transmission time intervals, full duplex capability of the UE, a beamforming capability of the UE, supported frequency ranges of the UE, supported bandwidth of the UE, to give just a few examples of transmission parameters. Further transmission parameters have been discussed above in connection with TAB. 4.

Next, at box 3015, first data—e.g., the payload data 271—is communicated. The first data may be communicated using the data connection having been established at box 3005.

The first data is communicated using one or more multi-layer communication protocol stacks. The one or more multi-layer communication protocol stacks can use one or more communication protocols. Techniques of bonding multiple logical links have been discussed above in connection with FIG. 3.

At optional box 3020, it is checked whether one or more trigger events for transmitting second data are present. Example trigger events have been discussed above in connection with TAB. 1.

For instance, the trigger events may be fixedly predefined according to the communication protocol. It would also be possible that a control message indicative of a reporting configuration associated with the second data received from the cellular network and the reporting configuration can be indicative of the trigger event.

At optional box 3025, an aggregated processing load used by the UE to operate a predetermined section of a least one multi-layer communication protocol stack of a least one communication protocol used when communicating the first data is determined, based on monitoring the operation of the multi-layer communication protocol stack. Then, at box 3035, second data that is indicative of the aggregated processing load is determined at box 3025 is transmitted, e.g., using preallocated re-occurring resources (cf. FIG. 2, re-occurring resources 371). For example, the preallocated reoccurring resources may be scheduled when establishing the data connection at box 3005.

Details of the second data have been explained in connection with FIG. 2, PLD 272.

It would then be possible to receive, at box 3040, from the cellular NW, a control message that includes values of one or more transmission parameters of the one or more communication protocols used for communicating the first data at box 3015. Again, transmission parameters have been discussed above in connection with TAB. 4. The values of the one or more transmission parameters are set in accordance with the aggregated processing load, as communicated in the same the loop 3045 at box 3035. Thereby, low-latency feedback and adjustment of the values of the one or more transmission parameter is possible.

The values of the one or more transmission parameters can also be set in accordance with the capability as indicated in the capability control message transmitted at box 3010. For instance, the values of the one or more transmission parameters can be set within one or more acceptable range is associated with the one or more transmission parameters and as defined by the capability.

Then, a further iteration of loop 3045, the first data is again communicated at another iteration of box 3015; multiple instances of the first data can encode different information.

As will be appreciated, multiple instances of the second data are transmitted in multiple iterations of the loop 3045. The aggregated processing load is repeatedly determined based on monitoring the operation of the at least one multi-layer communication protocol stack changes from iteration to iteration.

Figure 7:
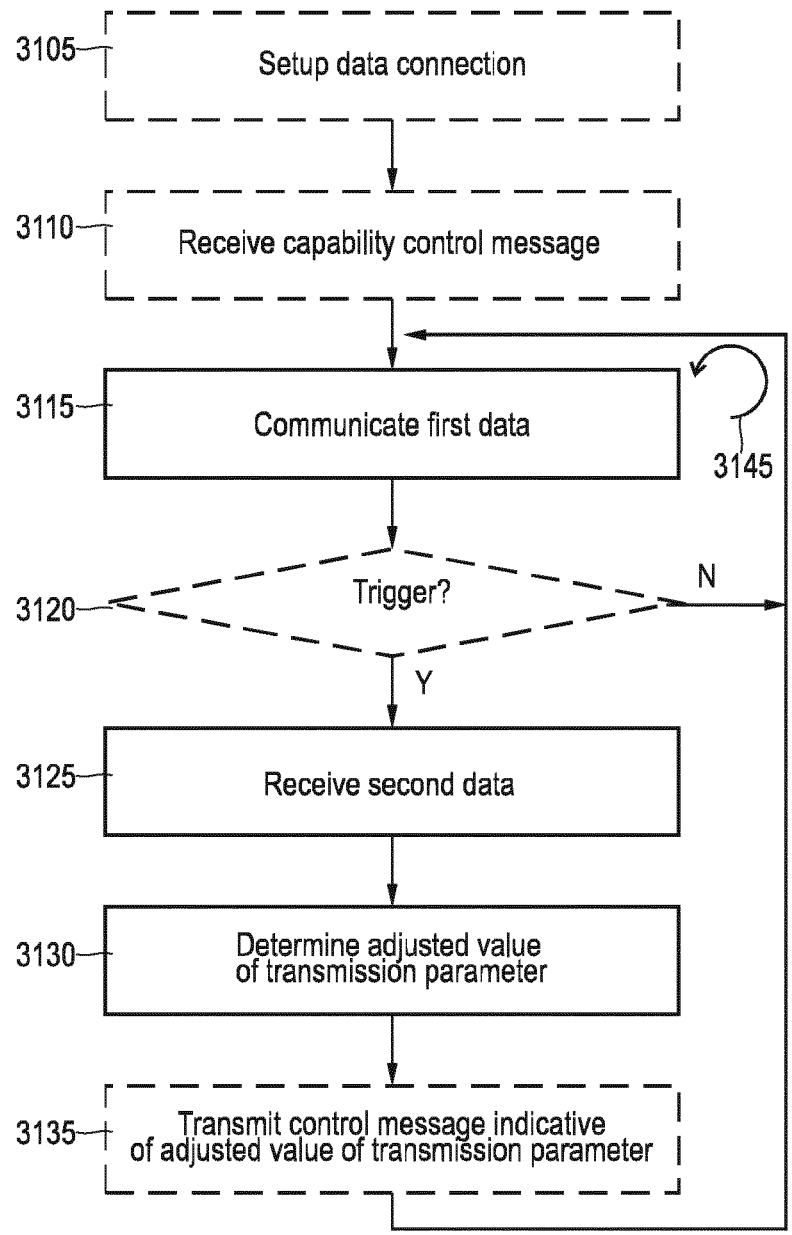
FIG. 7 is a flowchart of a method according to various examples.

FIG. 7 is a flowchart of a method according to various examples. The method of FIG. 7 can be implemented by a BS such as the BS 112. The BS can communicate with a UE.

The BS is part of a cellular NW or another communications NW. More specifically, it would be possible that the method of FIG. 7 is executed by the processor 1121 upon loading respective program code from the memory 1122. Optional boxes are illustrated using dashed lines in FIG. 7.

At optional box 3105, a data connection towards the UE is set up, for communicating first data. This can include receiving a random-access control message and optionally paging the UE. Box 3105 corresponds to and is interrelated with box 3005 of FIG. 6.

At optional box 3110, a capability control message is received from the UE, e.g., using the data connection setup at box 3105. The capability control message is indicative of a capability of the UE to support values of one or more transmission parameters for communicating first data on the data connection that is set up at box 3105. Box 3110 is thus interrelated and corresponds to box 3010 of FIG. 6.

At box 3115, the first data is communicated using the data connection. Box 3115 thus corresponds to end is interrelated to box 3015.

At box 3120, it is checked whether one or more predefined trigger events occurred. In the affirmative, second data is received at box 3125.

The trigger events of box 3120 can correspond to the trigger events 3020. As a general rule, the trigger events may be UE-centric; in such a scenario may not be required to implement box 3120—even if the UE implements box 3020. The BS may then just monitor whether the second data is in fact received later on.

The second data received at box 3125 corresponds to the second data that is transmitted at box 3035 of FIG. 6. The second data could be native to Layer 1. As a general rule, according to the various examples described herein, the second data could be native to a lower layer if compared to the layer to which the capability control message of box 3110 is native.

Next, at box 3130, adjusted values of one or more transmission parameters are determined. This is based on the second data of box 3125 and in accordance with the aggregated processing load indicated by the second data, as well as, optionally, based on the capability of the capability control message received at box 3110.

Adjusting the values of the one or more transmission parameters can correspond to setting values of the one or more transmission parameters that are at least partly different from the current values of the one or more transmission parameters used for communicating the first data at the respective preceding iteration of box 3115.

Once the adjusted values of the one or more transmission parameters have been determined at box 3130, a respective control message—e.g., defined on Layer 3, e.g., a RRC control message—is transmitted to the UE at box 3135.

Then, a further loop 3145 is executed, and further first data is communicated at box 3115 using the adjusted values of the one or more transmission parameters.

Summarizing, according to various examples techniques have been described of a UE transmitting, e.g., via physical layer (Layer 1) signaling, uplink control information indicative of a dynamic UE processing load level to a network node. The processing load level can be used to adapt the data transmission configuration for the communication with the network.

Although the disclosure has been shown and described with respect to certain preferred embodiments, equivalents and modifications will occur to others skilled in the art upon the reading and understanding of the specification. The present disclosure includes all such equivalents and modifications and is limited only by the scope of the appended claims.

The invention claimed is:

1. A method of operating a wireless communication device connectable to a communications network, the method comprising:
   communicating, using at least one communication protocol, first data between the wireless communication device and the communications network, and
   transmitting, to the communications network, second data indicative of an aggregated processing load used by the wireless communication device to operate a predetermined section of at least one multi-layer communication protocol stack of the at least one communication protocol when communicating the first data.

2. The method of claim 1, wherein the predetermined section of the at least one multi-layer communication protocol stack comprises at least an Automatic Repeat Request (ARQ) process at Layer 2 of the multi-layer communication protocol stack.

3. The method of claim 1, wherein the second data is indicative of a delay in providing a positive or negative acknowledgement of an Automatic Repeat Request (ARQ) process at Layer 2 in response to receiving a data packet of the first data, the delay being caused by the aggregated processing load.

4. The method of claim 1, wherein the predetermined section of the at least one multi-layer communication protocol stack comprises at least demodulation and decoding of data blocks of the first data at Layer 1 of the at least one multi-layer communication protocol stack.

5. The method of claim 1, wherein the second data is indicative of a delay in commanding and executing a switch between two frequency bands at the wireless communication device, the delay being caused by the aggregated processing load.

6. The method of claim 1, wherein the second data is indicative of a delay in commanding and executing a switch between two beams at the wireless communication device when communicating the first data, the delay being caused by the aggregated processing load.

7. The method of claim 1, wherein the first data is communicated based on a first value of a transmission parameter of the at least one communication protocol, wherein the second data is indicative of a processing headroom of the wireless communication device, the processing headroom being associated with the aggregated processing load and available to support a second value of the transmission parameter, the second value being different from the first value.

8. The method of claim 7, wherein the transmission parameter is selected from the group comprising: a data rate of the first data; a modulation and/or coding scheme of the first data; a subcarrier spacing; a transmission time interval duration; a configuration of an Automatic Repeat Request (ARQ) process.

9. The method of claim 7, wherein the transmission parameter comprises a count of bundled parallel logical links between the wireless communication device and the communications network, the logical links optionally using at least one of multiple communication protocols, multiple bandwidth parts, or multiple Automatic Repeat Request (ARQ) processes.

10. The method of claim 7, transmitting a control message indicative of a communication capability of the wireless communication device to the communications network, wherein the first value and the second value of the transmission parameter are set in accordance with the communication capability.

11. The method of claim 1, wherein the predetermined section spans multiple processes between an air interface at a bottom of Layer 1 of the at least one multi-layer communication protocol stack and a bonding point at which multiple logical links between the wireless communication device and the communications network are fused.

12. The method of claim 1, wherein the predetermined section spans at least one layer boundary between two layers of the multi-layer communication protocol stack and/or spans multiple processes for communicating the first data at Layer 1 of the multi-layer communication protocol stack.

13. The method of claim 1, wherein the second data is native to Layer 1 of the multi-layer protocol stack, and wherein the first data is native to Layer 3 or higher of the multi-layer protocol stack.

14. The method of claim 1, wherein multiple instances of the second data are transmitted in pre-allocated re-occurring resources of an uplink control channel between the wireless communication device and the communications network.

15. The method of claim 1, wherein the second data is selectively transmitted in response to at least one trigger event.

16. The method of claim 15, wherein the at least one trigger event comprises at least one of a slotted transmission of the first data, the first data being associated with a predefined application, setup of a data connection of communicating the first data, or a change of a communication capability of the wireless communication device.

17. The method of claim 1, further comprising:
receiving, from the communications network, a control message indicative of a reporting configuration associated with the second data.

18. The method of claim 17, wherein the reporting configuration is indicative of at least one of an information content of the second data, a timing of repeatedly transmitting multiple instances of the second data, an information content of the second data, the predetermined section of the at least one multi-layer communication protocol stack, re-occurring resources of an uplink control channel between the wireless communication device and the communications network allocated to the second data, or at least one trigger event triggering said transmitting of the second data.

19. A method of operating an access node of a communications network, the method comprising:
communicating, using at least one communication protocol, first data between a wireless communication device and the communications network, and
receiving, from the wireless communications device, second data indicative of an aggregated processing load used by the wireless communication device to process the first data along a predetermined section of at least one multi-layer communication protocol stack of the at least one communication protocol.

20. A wireless communication device connectable to a communications network, the wireless communication device comprising at least one processor configured to load and execute program code, wherein the at least one processor, upon loading and executing the program code, is configured to:
communicate, using at least one communication protocol, first data between the wireless communication device and the communications network, and
transmit, to the communications network, second data indicative of an aggregated processing load used by the wireless communication device to operate a predetermined section of at least one multi-layer communication protocol stack of the at least one communication protocol when communicating the first data.

* * * * *